United States Patent
Okuda et al.

(10) Patent No.: US 9,484,572 B2
(45) Date of Patent: Nov. 1, 2016

(54) ELECTRODE ACTIVE MATERIAL FOR ALL SOLID STATE SECONDARY BATTERY AND ALL SOLID STATE SECONDARY BATTERY

(75) Inventors: Sayaka Okuda, Nagaokakyo (JP); Kazuhiro Yamada, Nagaokakyo (JP); Masanori Endo, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 13/587,237

(22) Filed: Aug. 16, 2012

(65) Prior Publication Data

US 2012/0308870 A1    Dec. 6, 2012

Related U.S. Application Data

(63) Continuation of application No. PCT/JP2010/073086, filed on Dec. 22, 2010.

(30) Foreign Application Priority Data

Feb. 18, 2010    (JP) .................................. 2010-033504

(51) Int. Cl.
| | |
|---|---|
| *H01M 4/583* | (2010.01) |
| *H01M 4/58* | (2010.01) |
| *H01M 4/64* | (2006.01) |
| *H01M 10/0562* | (2010.01) |

(Continued)

(52) U.S. Cl.
CPC ............ *H01M 4/133* (2013.01); *H01M 4/587* (2013.01); *H01M 10/0525* (2013.01); *H01M 2004/021* (2013.01); *Y02E 60/122* (2013.01)

(58) Field of Classification Search
None
See application file for complete search history.

(56) References Cited

U.S. PATENT DOCUMENTS

| | | | | |
|---|---|---|---|---|
| 5,647,963 | A * | 7/1997 | Zhang et al. | 204/294 |
| 7,018,603 | B2 * | 3/2006 | Ritchie et al. | 423/511 |

(Continued)

FOREIGN PATENT DOCUMENTS

| | | |
|---|---|---|
| JP | 5-209833 A | 8/1993 |
| JP | 8-053642 A | 2/1996 |

(Continued)

OTHER PUBLICATIONS http://epswww.unm.edu/xrd/xrdclass/06-Diffraction-II.pdf.*

(Continued)

*Primary Examiner* — Patrick Ryan
*Assistant Examiner* — Christopher Domone
(74) *Attorney, Agent, or Firm* — Arent Fox LLP

(57) ABSTRACT

An electrode active material for an all solid state secondary battery, which is able to have the controlled orientation of a crystal face at the interface between an electrode layer and an electrolyte layer in order to enhance the battery performance, and an all solid state secondary battery including the electrode active material. The electrode active material includes a carbon material having an intensity ratio ($P_{002}/P_{100}$) of 600 or less between the X-ray diffraction peak intensity $P_{002}$ in the (002) plane and the X-ray diffraction peak intensity $P_{100}$ in the (100) plane, which are obtained when a surface of a compact prepared by compression molding of a powder of the carbon material at a pressure of 110 MPa is irradiated with X-ray. The all solid state secondary battery includes a positive electrode, a negative electrode, and a solid electrolyte, and the negative electrode contains the electrode active material.

19 Claims, 3 Drawing Sheets

(51) Int. Cl.
  *H01M 4/133* (2010.01)
  *H01M 4/587* (2010.01)
  *H01M 10/0525* (2010.01)
  *H01M 4/02* (2006.01)

(56) References Cited

U.S. PATENT DOCUMENTS

2007/0037040 A1* 2/2007 Koyama et al. ............. 429/44
2007/0190423 A1* 8/2007 Ishii et al. ................ 429/231.8
2007/0248888 A1* 10/2007 Seino et al. ................. 429/304
2011/0171537 A1* 7/2011 Takeuchi et al. ............ 429/322

FOREIGN PATENT DOCUMENTS

| JP | 8-078010 A | 3/1996 |
| JP | 2002-216754 A | 8/2002 |
| JP | 2003-068361 A | 3/2003 |
| JP | 2006-273615 A | 10/2006 |
| JP | 2007-242282 A | 9/2007 |
| JP | 2008-084798 A | 4/2008 |
| JP | 2009-054596 A | 3/2009 |
| WO | WO-9960652 A1 | 11/1999 |

OTHER PUBLICATIONS

PCT/JP2010/073086 International Search Report dated Mar. 28, 2011.

PCT/JP2010/073086 Written Opinion dated Mar. 28, 2011.

* cited by examiner

ELECTRODE ACTIVE MATERIAL FOR ALL SOLID STATE SECONDARY BATTERY AND ALL SOLID STATE SECONDARY BATTERY

CROSS REFERENCE TO RELATED APPLICATIONS

The present application is a continuation of International application No. PCT/JP2010/073086, filed Dec. 22, 2010, which claims priority to Japanese Patent Application No. 2010-033504, filed Feb. 18, 2010, the entire contents of each of which are incorporated herein by reference.

FIELD OF THE INVENTION

The present invention generally relates to an electrode active material for an all solid state secondary battery, and an all solid state secondary battery, and more particularly, relates to an electrode active material including a carbon material, and an all solid state secondary battery including a negative electrode containing the electrode active material.

BACKGROUND OF THE INVENTION

In recent years, with the development of portable electronic devices such as cellular phones and laptop personal computers, the demand for secondary batteries has been increased as cordless power sources for these electronic devices. Above all, the development of rechargeable lithium ion secondary batteries which are high in energy density have been carried out actively.

In addition, with functional increases of portable electronic devices, the power consumption has been increased significantly. In order to address the increase in power consumption, there has been a need for high-capacity lithium ion secondary batteries.

Lithium ion secondary batteries typically use a metal oxide such as a lithium cobalt oxide as a positive electrode active material, a carbon material such as graphite as a negative electrode active material, and lithium hexafluorophosphate dissolved in an organic solvent, that is, an organic solvent based electrolyte solution as an electrolyte. In the case of the thus configured batteries, there have been attempts to increase the internal energy by increasing the amounts of the active materials, and improve the output current by further increasing the energy density. In addition, the batteries are also expected to be increased in size, and mounted on cars.

However, in the above configured lithium ion secondary batteries, the organic solvent used for the electrolyte is a combustible substance, and the batteries thus have a risk such as battery ignition. For this reason, it has been desired to further enhance the safety of the batteries.

Therefore, one measure to enhance the safety of the lithium ion secondary batteries is to use a solid electrolyte as the electrolyte, in place of the organic solvent based electrolyte solution. It has been under consideration to apply, as the solid electrolyte, an organic solvent based material such as polymers and gels and an inorganic material such as glass and ceramics. Above all, all solid state secondary batteries have been proposed, and attracting attention, which use, as a solid electrolyte, an inorganic material containing incombustible glass or ceramic as its main constituent.

For example, Japanese Patent Application Laid-Open No. 2003-68361 (hereinafter, referred to as Patent Document 1) discloses the configuration of an all solid state lithium secondary battery including an incombustible solid electrolyte. In this all solid state lithium secondary battery, the solid electrolyte includes a sulfide as a fundamental composition, which is a material composed of a lithium sulfide and a phosphorus sulfide, or a material mainly containing a lithium sulfide and a phosphorus sulfide, containing no transition metal element, and containing no silicon or germanium; a negative electrode active material is a carbon material, or a material of lithium ions inserted between layers of a carbon material; and a lithium cobalt oxide, a lithium nickel oxide, a lithium manganese oxide, or the like is used as a positive electrode active material. In addition, Patent Document 1 discloses that battery characteristics vary greatly depending on the type of the solid electrolyte when graphite is used as the negative electrode active material, and that the selection of a lithium ion conducting solid electrolyte is important in order to prepare an all solid state lithium secondary battery which has excellent performance. Based on this consideration, it is disclosed that the use of a sulfide containing no silicon or germanium as the solid electrolyte makes it possible to increase the energy density of the all solid state lithium secondary battery.

Patent Document 1: Japanese Patent Application Laid-Open No. 2003-68361

SUMMARY OF THE INVENTION

Patent Document 1 discloses the selection of a suitable material for the lithium ion conducting solid electrolyte in contact with the negative electrode active material, in an all solid state secondary battery using a carbon material for the negative electrode active material, in particular, an all solid state lithium secondary battery using graphite for the negative electrode active material. However, Patent Document 1 fails to consider what properties the carbon material has for use as the negative electrode active material.

In general, in the case of an all solid state secondary battery, electrode layers (a positive electrode layer and a negative electrode layer) and an electrolyte layer are prepared by compression molding of a powdery material. In this case, the battery performance is affected by the orientation of the crystal face at the interface between the electrode layer and the electrolyte layer. Therefore, in order to achieve desired battery performance, it is critically important to control the orientation of the crystal face at the interface between the electrode layer and the electrolyte layer. Specifically, the battery performance is affected by the orientation of the crystal face at the surface of a pellet (compact) prepared by compression molding of a powdery electrode material, and it is thus important to control the orientation of the crystal face at the surface of the pellet in order to achieve desired battery performance. In this case, while it is also important to control the orientation of the crystal face in a powdered form of the electrode active material for forming the pellet, it is particularly important to control the orientation of the crystal face in the pellet form of the electrode active material. In addition, because powders of a solid electrolyte material and an electrode active material are mixed and subjected to compression molding to prepare the electrode layer, it is also important to control the orientation of the crystal face in a pellet form of the mixture material of the solid electrolyte material and electrode active material.

Therefore, an object of the present invention is to provide an electrode active material for an all solid state secondary battery, which is able to have the controlled orientation of a crystal face at the interface between an electrode layer and an electrolyte layer in order to enhance the battery performance, and an all solid state secondary battery including the electrode active material.

The inventors have kept earnest research on a method for controlling the orientation of a crystal face at the interface between an electrode layer and an electrolyte layer in order to enhance the battery performance, in particular, a method for controlling the orientation of a crystal face at the interface between a negative layer and an electrolyte layer in order to enhance the battery performance when a carbon material is used for a negative electrode active material. As a result, the inventors have found that the battery performance is affected significantly by the orientation of the crystal face at the surface of a compact prepared by compression molding of a carbon material as an electrode active material at a pressure of 110 MPa. On the basis of this finding, an electrode active material for an all solid state secondary battery according to the present invention has the following features.

The electrode active material for an all solid state secondary battery according to the present invention is an electrode active material for an all solid state secondary battery, the material comprising a carbon material, wherein the intensity ratio ($P_{002}/P_{100}$) is 600 or less between the X-ray diffraction peak intensity $P_{002}$ in the (002) plane and the X-ray diffraction peak intensity $P_{100}$ in the (100) plane, which are obtained when the surface of a compact prepared by compression molding of a powder of the carbon material at a pressure of 110 MPa is irradiated with X-ray.

The use of the electrode active material for an all solid state secondary battery according to the present invention can achieve an all solid state secondary battery which is able to be charged and discharged even at a high current density without being short-circuited, and has favorable rate characteristics.

The intensity ratio ($P_{002}/P_{100}$) is preferably 240 or less between the X-ray diffraction peak intensity $P_{002}$ in the (002) plane and the X-ray diffraction peak intensity $P_{100}$ in the (100) plane, which are obtained when the surface of a compact prepared by compression molding of a mixed powder at a pressure of 330 MPa is irradiated with X-ray, wherein the mixed powder is obtained by mixing a powder of the carbon material constituting the electrode active material for an all solid state secondary battery according to the present invention and a powder of a solid electrolyte containing at least sulfur and phosphorus at a ratio by weight of 1:1.

The use of the electrode active material for an all solid state secondary battery, which exhibits the characteristics mentioned above, can achieve an all solid state secondary battery which is able to be charged and discharged even at a higher current density without being short-circuited, and has excellent rate characteristics.

An all solid state secondary battery according to the present invention is an all solid state secondary battery including a positive electrode, a negative electrode, and a solid electrolyte, wherein the negative electrode contains the electrode active material for an all solid state secondary battery, which has the features described above.

In the all solid state secondary battery according to the present invention, the solid electrolyte preferably contains Li, P, and S, as constituent elements.

In addition, in the all solid state secondary battery according to the present invention, the positive electrode preferably contains a sulfide.

In this case, the sulfide is preferably $Li_2FeS_2$.

Furthermore, in the all solid state secondary battery according to the present invention, the negative electrode is preferably prepared by compression molding of a material powder.

It is to be noted that the all solid state secondary battery according to the present invention is preferably used in a self-contained form.

The use of the electrode active material for an all solid state secondary battery according to the present invention can achieve an all solid state secondary battery which is able to be charged and discharged even at a high current density without being short-circuited, and has favorable rate characteristics.

DETAILED DESCRIPTION OF THE INVENTION

Embodiments of the present invention will be described below with reference to the drawings.

Figure 1A:
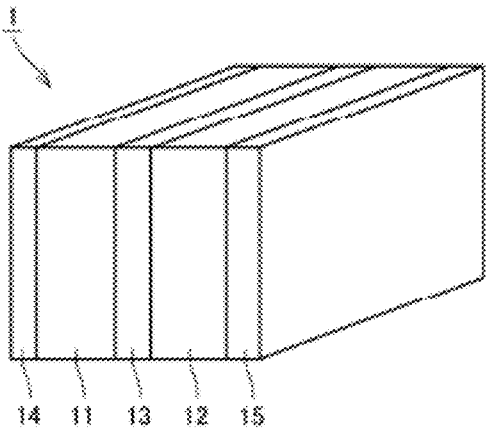
FIGS. 1(A) to 1(C) are perspective views illustrating the configuration of an all solid state secondary battery as one embodiment of the present invention in order in accordance with a manufacturing process.
Figure 1B:
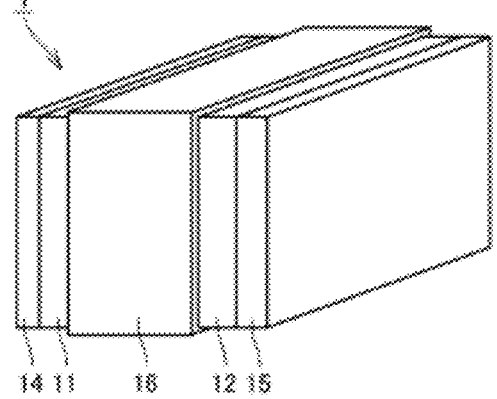
Figure 1C:
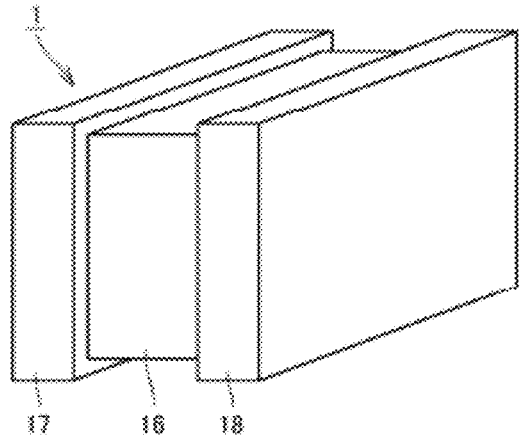

As shown in FIGS. 1(A) to 1(C), an all solid state secondary battery 1 is formed in the shape of a cuboid as one embodiment of the present invention, and composed of a laminated body including multiple flat plate layers with rectangular planes. In addition, as shown in FIGS. 2(A) to 2(C), an all solid state secondary battery 2 is formed in the shape of a circular cylinder as another embodiment of the present invention, and composed of a laminated body including multiple disk-shaped layers.

Figure 2A:
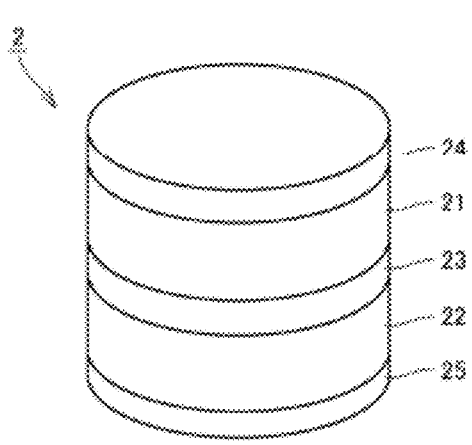
FIGS. 2(A) to 2(C) are perspective views illustrating the configuration of an all solid state secondary battery as another embodiment of the present invention in order in accordance with a manufacturing process.

As shown in FIG. 1(A) and FIG. 2(A), the all solid state secondary batteries 1, 2, include solid electrolytes 13, 23 sandwiched between positive electrodes 11, 21 and negative electrodes 12, 22, and positive electrode current collectors 14, 24 are attached to the outer surfaces of the positive electrodes 11, 21, whereas negative electrode current collectors 15, 25 are attached to the outer surfaces of the negative electrodes 12, 22. The positive electrodes 11, 21 contain $Li_2FeS_2$ as a positive electrode active material, and a $Li_2S$—$P_2S_5$ based composition as a solid electrolyte. The negative electrodes 12, 22 contain a carbon material, graphite (graphite) as a negative electrode active material, and a $Li_2S$—$P_2S_5$ based composition as a solid electrolyte. The solid electrolytes 13, 23 sandwiched between the positive electrodes 11, 21 and the negative electrodes 12, 22 are $Li_2S$—$P_2S_5$ based compositions. The positive electrodes 11, 21, the negative electrodes 12, 22, and the solid electrolytes 13, 23 are each prepared by compression molding of raw material powders. The positive electrode current collectors 14, 24, and the negative electrode current collectors 15, 25 are formed from, for example, a gold thin film or a carbon material.

Figure 2B:
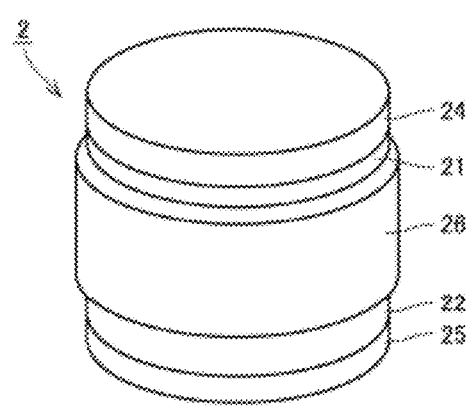

Next, as shown in FIG. 1(B) and FIG. 2(B), protective films 16, 26 are formed so as to coat at least the solid electrolytes 13, 23 sandwiched between the positive electrodes 11, 21 and the negative electrodes 12, 22, and so as not to coat the positive electrode current collectors 14, 24 and the negative electrode current collectors 15, 25. The protective films 16, 26 are formed from, for example, a polyimide resin. It is to be noted that the protective films 16, 26 may be formed by stacking multiple layers.

Figure 2C:
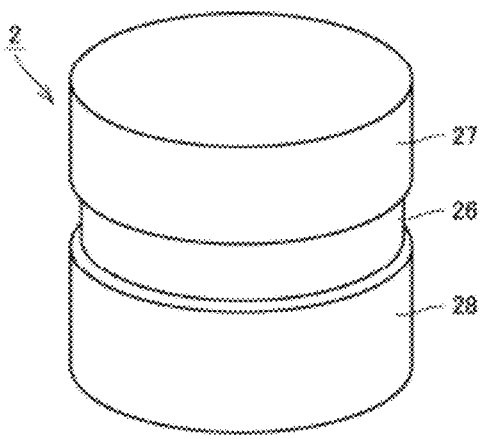
Figure 3A:
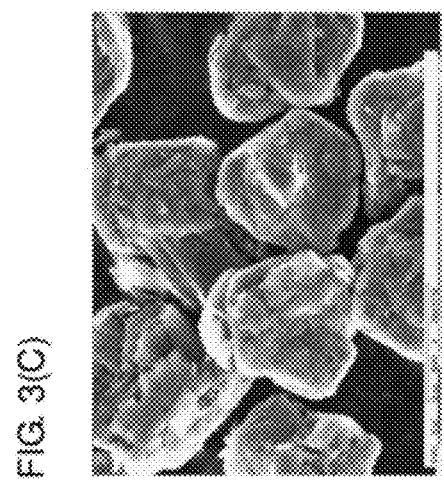
FIGS. 3(A) to 3(F) are photographs of carbon material powders used as electrode active materials for all solid state secondary batteries in examples of the present invention and comparative examples, which were observed under a scanning electron microscope (SEM).
Figure 3B:
Figure 3C:
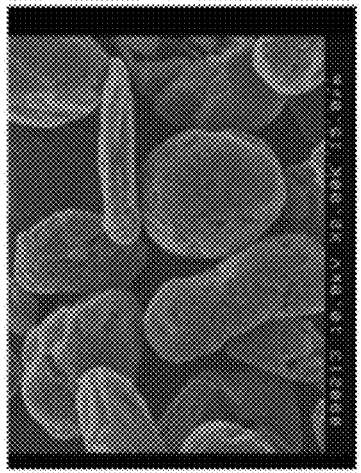
Figure 3D:
Figure 3E:
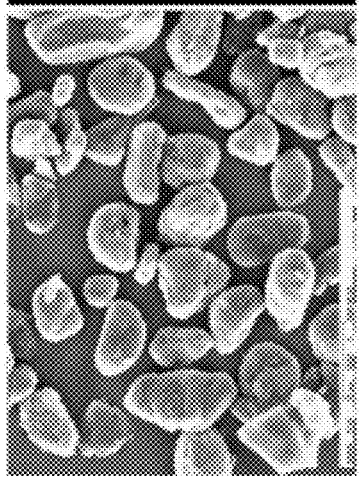
Figure 3F:
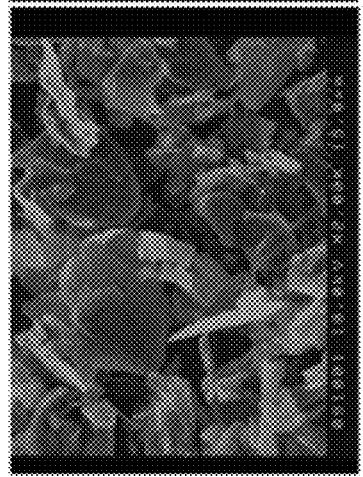

Finally, as shown FIG. 1(C) and FIG. 2(C), end surface electrodes 17, 27 for the positive electrodes are formed so as to coat the positive electrode current collectors 14, 24 and outer portions of the positive electrodes 11, 21 on the positive electrode current collectors 14, 24, whereas end surface electrodes 18, 28 for the negative electrodes are formed so as to coat the negative electrode current collectors 15, 25 and outer portions of the negative electrodes 12, 22 on the negative electrode current collectors 15, 25. The end surface electrodes 17, 27, and 18, 28 are preferably formed from, for example, a mixture of silver and a polyamideimide resin.

It is to be noted that in the case of the all solid state secondary batteries 1, 2 according to the present invention, the battery element shown in FIG. 1(A) or FIG. 2(A) may be used in the form of encapsulation in a stainless-steel coin case, an airtight package (PKG) using a ceramic substrate, or an aluminum (Al) laminate, or the form shown in FIG. 1(C) or FIG. 2(C) may be used as it is in its self-contained form.

In the all solid state secondary batteries 1, 2 as embodiments of the present invention, the carbon material powder, for example, a graphite powder, used as a negative electrode active material is to satisfy the following characteristics.

First, the intensity ratio ($P_{002}/P_{100}$) is 600 or less between the X-ray diffraction peak intensity $P_{002}$ in the (002) plane and the X-ray diffraction peak intensity $P_{100}$ in the (100) plane, which are obtained when the surface of a compact, for example, a pellet prepared by compression molding of the carbon material powder at a pressure of 110 MPa is irradiated with X-ray.

The use of the carbon material which satisfies the characteristics mentioned above, as the electrode active material for an all solid state secondary battery, in particular, as the negative electrode active material, can achieve an all solid state secondary battery which is able to be charged and discharged even at a high current density without being short-circuited, and has favorable rate characteristics.

When the X-ray diffraction peak intensity ratio ($P_{002}/P_{100}$) is 600 or less at the surface of a pellet prepared from the carbon material powder, the (100) plane is oriented more than the (002) plane at the interfaces between the negative electrodes 12, 22 containing the negative electrode active material composed of the carbon material and the solid electrolytes 13, 23. For this reason, lithium ion insertion and desorption proceed smoothly at the interfaces between the negative electrodes 12, 22 and the solid electrolytes 13, 23. These smooth insertion and desorption are considered to make it possible to achieve an all solid state secondary battery which has favorable rate characteristics.

On the other hand, when the X-ray diffraction peak intensity ratio ($P_{002}/P_{100}$) is greater than 600 at the surface of a pellet prepared from the carbon material powder, an all solid state secondary battery configured with the use of the carbon material as the negative electrode active material is likely to cause partial shorting in the case of charging at a high current value, and thus not able to be charged or discharged, thereby making it impossible to be used as a battery.

In addition, the intensity ratio ($P_{002}/P_{100}$) is preferably 240 or less between the X-ray diffraction peak intensity $P_{002}$ in the (002) plane and the X-ray diffraction peak intensity $P_{100}$ in the (100) plane, which are obtained when a compact, for example, the surface of a pellet prepared by compression molding of a mixed powder at a pressure of 330 MPa is irradiated with X-ray, where the mixed powder is obtained by mixing the carbon material powder constituting the electrode active material for an all solid state secondary battery and a solid electrolyte powder containing at least sulfur and phosphorus at a ratio by weight of 1:1.

The use of the carbon material which exhibits the characteristics mentioned above, as the electrode active material for an all solid state secondary battery, in particular, as the negative electrode active material, can achieve an all solid state secondary battery which is able to be charged and discharged even at a higher current density without being short-circuited, and has excellent rate characteristics.

It is to be noted that carbon materials such as artificial graphite and natural graphite can be used as the negative electrode active material. In this case, the powdered form of the carbon material may be scale-like, spherical, massive, fractured, etc., and in particular, preferably spherical, massive, or fractured. As the positive electrode active material, while $Li_2FeS_2$ is used in the embodiment described above, a sulfide such as $LiTiS_2$, $LiVS_2$, $Li_2FePS_2$, and $Li_2MS_2$ (M is at least one of Mn, Ni, Co, and Cu), or an oxide such as a lithium cobalt oxide and a lithium manganese oxide may be used besides $Li_2FeS_2$. While the solid electrolyte is a $Li_2S$—$P_2S_5$ based composition in the embodiment described above, a sulfide glass ceramic is preferable specifically which is synthesized by mixing $Li_2S$ and $P_2S_5$ at a molar ratio of 7:3 or 8:2. In addition, as the solid electrolyte, lithium-phosphorus based, lithium-silicon based, lithium-boron based, and lithium-germanium based sulfides and the like may be used besides the $Li_2S$—$P_2S_5$ based composition.

Next, examples of the present invention will be specifically described. It is to be noted that the following examples are by way of example, and the present invention is not to be considered limited to the following examples.

EXAMPLES

Examples 1 to 4 and Comparative examples 1 to 2 of all solid state secondary batteries will be described below, which use various types of carbon materials as negative electrode active materials.

First, the various types of carbon materials for use as negative electrode active materials were evaluated for their properties in the following way.

(Evaluation of Carbon Material for Negative Electrode Active Material)

Commercially available carbon material powders A to F used were evaluated for the following properties (1) to (5).

(1) Particle Size ($D_{50}$)

For the carbon material powders A to F, the average particle size $D_{50}$ was measured by a laser diffraction and scattering method. Table 1 shows the $D_{50}$ for the carbon material powders A to F.

(2) Specific Surface Area [$m^2/g$]

For the carbon material powders A to F, the specific surface area was measured by a BET method with the use of a system named Macsorb from Mountech Co., Ltd. Table 1 shows the specific surface area for the carbon material powders A to F.

(3) Observation Through Scanning Electron Microscope (SEM)

FIGS. 3(A) to 3(F) show photographs through the observation of the carbon material powders A to F, respectively, under a scanning electron microscope (SEM).

(4) X-ray Diffraction Peak Intensity Ratio ($P_{002}/P_{100}$) at Surface of Carbon Pellet About 100 mg of each carbon material powder was subjected to compression molding at a pressure of 110 MPa to prepare carbon pellets of approximately 0.6 mm in thickness and approximately 10 mm in outside diameter. The surface of each carbon pellet obtained is irradiated with X-ray at an incidence angle in the range of 20 to 80° to measure the X-ray diffraction. The intensity ratio ($P_{002}/P_{100}$) was obtained between the X-ray diffraction peak intensity $P_{002}$ in the (002) plane and the X-ray diffraction peak intensity $P_{100}$ in the (100) plane, which were obtained in this case. Table 1 shows the obtained X-ray diffraction peak intensity ratio (carbon $P_{002}/P_{100}$).

(5) X-ray Diffraction Peak Intensity Ratio ($P_{002}/P_{100}$) at Surface of Mixture Pellet About 100 mg of a mixed powder in which each carbon material powder and a solid electrolyte powder were mixed at a ratio by weight of 1:1 was subjected to compression molding at a pressure of 330 MPa to prepare mixture pellets of approximately 0.6 mm in thickness and approximately 10 mm in outside diameter. The surface of each mixture pellet obtained is irradiated with X-ray at an incidence angle in the range of 20 to 80° to measure the X-ray diffraction. The intensity ratio ($P_{002}/P_{100}$) was obtained between the X-ray diffraction peak intensity $P_{002}$ in the (002) plane and the X-ray diffraction peak intensity $P_{100}$ in the (100) plane, which were obtained in this case. Table 1 shows the obtained X-ray diffraction peak intensity ratio (mixture $P_{002}/P_{100}$). It is to be noted that the solid electrolyte powder used for the preparation of the mixture pellets was prepared in the way described later.

to obtain a sulfide based glass ceramic powder. This sulfide based glass ceramic powder was used as the solid electrolyte.

(Preparation of Positive Electrode Active Material Powder)

A $Li_2S$ powder and a FeS powder were weighed to have a molar ratio of 1:1, and mixed to obtain a 1 g of mixture. The obtained mixture was heated at a temperature of 950° C. to prepare a $Li_2FeS_2$ powder. The obtained $Li_2FeS_2$ powder was used as the positive electrode active material.

(Preparation of Electrode Mixture Powder)

Each of the carbon material powders A to F evaluated above, and the solid electrolyte powder prepared above were mixed at a ratio by weight of 1:1 to prepare a negative electrode mixture powder. In addition, the positive electrode active material powder and solid electrolyte powder prepared above were mixed at a ratio by weight of 1:1 to prepare a positive electrode mixture powder.

The solid electrolyte powder and electrode mixture powders prepared in the way described above were used to prepare the following all solid state lithium secondary batteries according to Examples 1 to 4 and Comparative Examples 1 to 2 in the form as shown in FIGS. 2(A) to 2(C).

Example 1

The solid electrolyte powder was put in a mold of 10 mm in inside diameter, and subjected to pressing to prepare a solid electrolyte layer. The positive electrode mixture powder was put on one side of the solid electrolyte layer, whereas the negative electrode mixture powder containing the carbon material powder A was put on the other side thereof, and pressing was carried out at a pressure on the order of 100 to 500 MPa, preferably on the order of 150 to 450 MPa to prepare an a battery pellet of approximately 0.6

TABLE 1

|  | Carbon Material Powder A | Carbon Material Powder B | Carbon Material Powder C | Carbon Material Powder D | Carbon Material Powder E | Carbon Material Powder F |
|---|---|---|---|---|---|---|
| Particle Size D (50) [μm] | 14.9 | 21.9 | 19.0 | 13.5 | 9.9 | 8.8 |
| Specific Surface Area [m²/g] | 6.9 | 4.5 | 6.1 | 6.5 | 9.6 | 7.7 |
| Carbon $P_{002}/P_{100}$ | 276 | 334 | 171 | 569 | 637 | 894 |
| Mixture $P_{002}/P_{100}$ | 157 | 164 | 130 | 247 | 269 | 248 |

Next, in order to prepare all solid state secondary batteries as shown in FIGS. 2(A) to 2(C) with the use of each of the carbon material powders evaluated above as the negative electrode active material, a solid electrolyte powder, a positive electrode active material, and electrode mixture (positive electrode mixture and negative electrode mixture) powders were prepared in the following ways.

(Preparation of Solid Electrolyte Powder)

A $Li_2S$ powder and a $P_2S_5$ powder were weighed to have a molar ratio of 7:3, and mixed to obtain a 1 g of mixture. The obtained mixture was subjected to a mechanical milling treatment at a temperature of 25° C. and a revolution speed of 370 rpm for 20 hours in a nitrogen gas with the use of a planetary ball mill to obtain a whitish yellow glass powder. The obtained glass powder was put in a glass airtight container, and heated at a temperature of 300° C. for 2 hours mm in thickness. This battery pellet was inserted into a stainless-steel coin case to prepare an all solid state lithium secondary battery.

Example 2

Except for the use of a powder containing the carbon material powder B as the negative electrode mixture powder, an all solid state lithium secondary battery was prepared in the same way as in Example 1.

Example 3

Except for the use of a powder containing the carbon material powder C as the negative electrode mixture powder, an all solid state lithium secondary battery was prepared in the same way as in Example 1.

Example 4

Except for the use of a powder containing the carbon material powder D as the negative electrode mixture powder, an all solid state lithium secondary battery was prepared in the same way as in Example 1.

Comparative Example 1

Except for the use of a powder containing the carbon material powder E as the negative electrode mixture powder, an all solid state lithium secondary battery was prepared in the same way as in Example 1.

Comparative Example 2

Except for the use of a powder containing the carbon material powder F as the negative electrode mixture powder, an all solid state lithium secondary battery was prepared in the same way as in Example 1.

The all solid state lithium secondary batteries according to Examples 1 to 4 and Comparative Examples 1 to 2 prepared in the way described above were subjected to a charge-discharge test in the following way.

(Charge-Discharge Test)

The respective all solid state lithium secondary batteries were subjected to a charge rate test under the conditions of current density: 1.3 mA/cm$^2$, 1.9 mA/cm$^2$, and 2.54 mA/cm$^2$. The charging capacity was adjusted to 200 mAh/g, whereas the discharge current value was adjusted to 0.12 mA/cm$^2$. The charge rate test was carried out in the order of current density: 1.3 mA/cm$^2$, 1.9 mA/cm$^2$, and 2.54 mA/cm$^2$, and if any abnormality in voltage was caused during the charging, the battery was considered to be short-circuited inside, and it was determined that charging was impossible at not less than the current density value at which the abnormality in voltage was caused. The results of the charge-discharge test are as follows for the all solid state lithium secondary batteries according to Examples 1 to 4 and Comparative Examples 1 to 2.

In the all solid state lithium secondary battery according to Example 1, the powder containing the carbon material powder A was used as the negative electrode mixture powder. As shown in Table 1, in the case of the carbon material powder A, the X-ray diffraction peak intensity ratio (carbon $P_{002}/P_{100}$) is 276 for the carbon pellet, and it is thus determined that the carbon material powder A is a carbon material with a low degree of orientation at the carbon pellet surface. In addition, the X-ray diffraction peak intensity ratio (mixture $P_{002}/P_{100}$) was 157 for the mixture pellet. As a result of using this carbon material with the low X-ray diffraction peak intensity ratio as the negative electrode active material, it has been determined that the battery is excellent in rate characteristics, because it is possible to charge the battery even at the current density of 2.54 mA/cm$^2$ and it is possible to charge and discharge the battery even at the high rate.

In the all solid state lithium secondary battery according to Example 2, the powder containing the carbon material powder B was used as the negative electrode mixture powder. As shown in Table 1, in the case of the carbon material powder B, the X-ray diffraction peak intensity ratio (carbon $P_{002}/P_{100}$) is 334 for the carbon pellet, and it is thus determined that the carbon material powder B is a carbon material with a low degree of orientation at the carbon pellet surface. In addition, the X-ray diffraction peak intensity ratio (mixture $P_{002}/P_{100}$) was 164 for the mixture pellet. As a result of using this carbon material with the low X-ray diffraction peak intensity ratio as the negative electrode active material, it has been determined that the battery is excellent in rate characteristics, because it is possible to charge the battery even at the current density of 2.54 mA/cm$^2$ and it is possible to charge and discharge the battery even at the high rate.

In the all solid state lithium secondary battery according to Example 3, the powder containing the carbon material powder C was used as the negative electrode mixture powder. As shown in Table 1, in the case of the carbon material powder C, the X-ray diffraction peak intensity ratio (carbon $P_{002}/P_{100}$) is 171 for the carbon pellet, and it is thus determined that the carbon material powder C is a carbon material with a low degree of orientation at the carbon pellet surface. In addition, the X-ray diffraction peak intensity ratio (mixture $P_{002}/P_{100}$) was 130 for the mixture pellet. As a result of using this carbon material with the low X-ray diffraction peak intensity ratio as the negative electrode active material, it has been determined that the battery is excellent in rate characteristics, because it is possible to charge the battery even at the current density of 2.54 mA/cm$^2$ and it is possible to charge and discharge the battery even at the high rate.

In the all solid state lithium secondary battery according to Example 4, the powder containing the carbon material powder D was used as the negative electrode mixture powder. As shown in Table 1, in the case of the carbon material powder D, the X-ray diffraction peak intensity ratio (carbon $P_{002}/P_{100}$) is 569 for the carbon pellet, and it is thus determined that the carbon material powder D is a carbon material with a low degree of orientation at the carbon pellet surface. In addition, the X-ray diffraction peak intensity ratio (mixture $P_{002}/P_{100}$) was 247 for the mixture pellet. As a result of using this carbon material as the negative electrode active material, it was possible to charge the battery at the current density of 1.3 mA/cm$^2$. However, because the carbon material was a material with a high degree of orientation at the mixture pellet surface, it was not possible to charge the battery at the current density of 1.9 mA/cm$^2$, and it has been thus determined that the battery is inferior in rate characteristics.

In the all solid state lithium secondary battery according to Comparative Example 1, the powder containing the carbon material powder E was used as the negative electrode mixture powder. As shown in Table 1, in the case of the carbon material powder E, the X-ray diffraction peak intensity ratio (carbon $P_{002}/P_{100}$) is 637 for the carbon pellet, and it is thus determined that the carbon material powder E is a carbon material with a high degree of orientation at the carbon pellet surface. In addition, the X-ray diffraction peak intensity ratio (mixture $P_{002}/P_{100}$) was 269 for the mixture pellet. As a result of using this carbon material with the high X-ray diffraction peak intensity ratio as the negative electrode active material, it was not possible to charge the battery even at the current density of 1.3 mA/cm$^2$.

In the all solid state lithium secondary battery according to Comparative Example 2, the powder containing the carbon material powder F was used as the negative electrode mixture powder. As shown in Table 1, in the case of the carbon material powder F, the X-ray diffraction peak intensity ratio (carbon $P_{002}/P_{100}$) is 894 for the carbon pellet, and it is thus determined that the carbon material powder F is a carbon material with a low degree of orientation at the carbon pellet surface. In addition, the X-ray diffraction peak intensity ratio (mixture $P_{002}/P_{100}$) was 248 for the mixture pellet. As a result of using this carbon material with the high X-ray diffraction peak intensity ratio as the negative electrode active material, it was not possible to charge the battery even at the current density of 1.3 mA/cm².

From the foregoing results, it is determined that charging is possible at a current density of 1.3 mA/cm² or more by the use of, for the negative electrode active material, the carbon material with the X-ray diffraction peak intensity ratio (carbon $P_{002}/P_{100}$) of 600 or less for the carbon pellet. Furthermore, when the X-ray diffraction peak intensity ratio (mixture $P_{002}/P_{100}$) is 240 or less for the mixture pellet, charging is possible even at higher rates, and it is thus determined that an all solid state lithium secondary battery can be achieved which is excellent in rate characteristics.

The embodiments and examples disclosed herein are by way of example in all respects, but not to be considered to limit the invention. The scope of the present invention is defined by the claims, not by the above embodiments or examples, and intended to encompass all modifications and variations within the meaning and scope equivalent to the claims.

According to the present invention, the all solid state secondary battery using a carbon material as an electrode active material can achieve an all solid state secondary battery, which is able to be charged and discharged even at a high current density without being short-circuited, and has favorable rate characteristics.

DESCRIPTION OF REFERENCE SYMBOLS

1, 2: all solid state secondary battery; 11, 21: positive electrode; 12, 22: negative electrode; 13, 23: solid electrolyte; 14, 24: positive electrode current collector; 15, 25: negative electrode current collector; 16, 26: protective film; 17, 27, 18, 28: end surface electrode

The invention claimed is:

1. An all solid state secondary battery comprising:
a positive electrode consisting of first inorganic materials containing a sulfide;
a negative electrode consisting of second inorganic materials; and
a solid electrolyte containing Li, P, and S as constituent elements thereof between the positive electrode and the negative electrode,
wherein the negative electrode contains an electrode active material comprising a compressed graphite having an intensity ratio ($P_{002}/P_{100}$) of 600 or less between a first X-ray diffraction peak intensity $P_{002}$ in a (002) plane and a second X-ray diffraction peak intensity $P_{100}$ in a (100) plane, the first and second X-ray diffraction peak intensities being obtained by irradiating a surface of a compact prepared by compression molding of a powder containing the graphite at a pressure of at least 110 MPa with X-ray.

2. The all solid state secondary battery according to claim 1, wherein the intensity ratio ($P_{002}/P_{100}$) is 240 or less.

3. The all solid state secondary battery according to claim 2, wherein the powder containing the graphite is a mixed powder, and the compact is prepared by compression molding the mixed powder at a pressure of at least 330 MPa.

4. The all solid state secondary battery according to claim 3, wherein the mixed powder comprises a powder of the graphite and a powder of a solid electrolyte containing at least sulfur and phosphorus at a ratio by weight of 1:1.

5. The all solid state secondary battery according to claim 2, wherein the intensity ratio ($P_{002}/P_{100}$) is at least 171.

6. The all solid state secondary battery according to claim 1, wherein the sulfide of the positive electrode is $Li_2FeS_2$.

7. The all solid state secondary battery according to claim 1, wherein the negative electrode is a compression molded graphite powder.

8. The all solid state secondary battery according to claim 1, wherein the all solid state secondary battery is configured as a self-contained form.

9. The all solid state secondary battery according to claim 1, further comprising a positive electrode current collector adjacent the positive electrode, and a negative electrode current collector adjacent the negative electrode.

10. The all solid state secondary battery according to claim 9, further comprising a protective film covering at least the solid electrolyte, and not covering the positive electrode current collector and the negative electrode current collector.

11. The all solid state secondary battery according to claim 10, wherein the protective film comprises a polyimide resin.

12. The all solid state secondary battery according to claim 10, further comprising a first end surface electrode covering the positive electrode and the positive electrode current collector; and a second end surface electrode covering the negative electrode and the negative electrode current collector.

13. The all solid state secondary battery according to claim 1, wherein the compressed graphite comprises a combination of the graphite and a solid electrolyte containing at least sulfur and phosphorus at a ratio by weight of 1:1.

14. The all solid state secondary battery according to claim 1, wherein the sulfide of the positive electrode active material is selected from the group consisting of $LiTiS_2$, $LiVS_2$, $Li_2FePS_3$, and $Li_2MS_2$, wherein M is at least one of Mn, Ni, Co, and Cu, or an oxide such as a lithium cobalt oxide and a lithium manganese oxide may be used besides $Li_2FeS_2$.

15. The all solid state secondary battery according to claim 1, wherein the sulfide of the positive electrode active material is selected from the group consisting of lithium cobalt oxide and lithium manganese oxide.

16. The all solid state secondary battery according to claim 1, wherein the solid electrolyte is a $Li_2S$—$P_2S_5$ based composition.

17. The all solid state secondary battery according to claim 1, wherein the solid electrolyte is a sulfide glass ceramic.

18. The all solid state secondary battery according to claim 17, wherein the a sulfide glass ceramic is a synthesized composition resulting from mixing $Li_2S$ and $P_2S_5$ at a molar ratio of 7:3 or 8:2.

19. The all solid state secondary battery according to claim 1, wherein the solid electrolyte is selected from the group consisting of lithium-phosphorus based sulfides, lithium-silicon based sulfides, lithium-boron based sulfides, and lithium-germanium based sulfides.

* * * * *